United States Patent
Jellison, Jr.

(10) Patent No.: US 9,665,569 B2
(45) Date of Patent: May 30, 2017

(54) CONTEXTUAL, FOCUS-BASED TRANSLATION FOR BROADCAST AUTOMATION SOFTWARE

(71) Applicant: Clear Channel Management Services, Inc., San Antonio, TX (US)

(72) Inventor: David C. Jellison, Jr., Ogallala, NE (US)

(73) Assignee: IHEARTMEDIA MANAGEMENT SERVICES, INC., San Antonio, TX (US)

( * ) Notice: Subject to any disclaimer, the term of this patent is extended or adjusted under 35 U.S.C. 154(b) by 372 days.

(21) Appl. No.: 14/263,421

(22) Filed: Apr. 28, 2014

(65) Prior Publication Data

US 2014/0236567 A1    Aug. 21, 2014

Related U.S. Application Data

(63) Continuation of application No. 12/625,089, filed on Nov. 24, 2009, now Pat. No. 8,732,577.

(51) Int. Cl.
*G06F 17/28* (2006.01)
*G06F 9/44* (2006.01)
*G06F 3/0482* (2013.01)

(52) U.S. Cl.
CPC ............ *G06F 17/28* (2013.01); *G06F 3/0482* (2013.01); *G06F 9/4448* (2013.01); *G06F 17/289* (2013.01)

(58) Field of Classification Search
CPC ........................................................ G06F 17/28
USPC .......................................................... 704/2–8
See application file for complete search history.

(56) References Cited

U.S. PATENT DOCUMENTS

| | | | | |
|---|---|---|---|---|
| 5,678,039 | A  * | 10/1997 | Hinks | G06F 9/4448 |
| 6,993,473 | B2 * | 1/2006  | Cartus | G06F 17/24 |
| | | | | 704/2 |
| 7,107,204 | B1 * | 9/2006  | Liu | G06F 17/273 |
| | | | | 704/2 |
| 7,899,390 | B1 * | 3/2011  | Littlejohn | H04H 20/103 |
| | | | | 379/101.01 |
| 7,913,228 | B2 * | 3/2011  | Ericsson | G06F 8/73 |
| | | | | 704/2 |
| 2001/0018649 | A1 | 8/2001  | Kasai et al. | |
| 2001/0029455 | A1 | 10/2001 | Chin et al. | |
| 2001/0056352 | A1 | 12/2001 | Xun | |
| 2003/0120478 | A1 | 6/2003  | Palmquist | |

(Continued)

*Primary Examiner* — Jesse Pullias
(74) *Attorney, Agent, or Firm* — Garlick & Markison; Edward J. Marshall

(57) ABSTRACT

Contextual, focus-based language translation within a broadcast radio automation software application allows the user interface to enable interaction with users having various written or graphical language requirements. The software does not require special training or learning to enable the translation of text within the application. When the user enters a translation mode and selects a text string in the original language, the program displays a corresponding text string in a second language based on the specific display area, e.g., child window. The translated text string can be displayed proximate to original first text string within the specific display area, and can further be displayed as an entry in a table of a translation window which also displays additional text strings in the second language corresponding to additional text string fields for the specific display area.

18 Claims, 4 Drawing Sheets

(56) References Cited

U.S. PATENT DOCUMENTS

| | | |
|---|---|---|
| 2004/0199392 A1 | 10/2004 | Khatri et al. |
| 2005/0288920 A1 | 12/2005 | Green et al. |
| 2006/0174196 A1 | 8/2006 | Zhang et al. |
| 2006/0268667 A1* | 11/2006 | Jellison, Jr. ....... G06F 17/30056 369/30.08 |
| 2008/0082317 A1 | 4/2008 | Rosart et al. |
| 2008/0288242 A1 | 11/2008 | Potter |
| 2008/0306725 A1 | 12/2008 | Moore |
| 2009/0125497 A1 | 5/2009 | Jiang et al. |

* cited by examiner

CONTEXTUAL, FOCUS-BASED TRANSLATION FOR BROADCAST AUTOMATION SOFTWARE

CROSS REFERENCE TO RELATED PATENTS

The present U.S. Utility patent application claims priority pursuant to 35 U.S.C. §120, as a continuation, U.S. Utility patent application Ser. No. 12/625,089, entitled, "CONTEXTUAL, FOCUS-BASED TRANSLATION FOR BROADCAST AUTOMATION SOFTWARE," filed Nov. 24, 2009, which is hereby incorporated herein by reference in its entirety and made part of the present U.S. Utility patent application for all purposes.

TECHNICAL FIELD

The present invention generally relates to language translation, and more particularly to a method of providing selected translations in a multi-lingual computer program.

BACKGROUND

There are many different software programs which can be used in conjunction with computers and other electronic devices to translate written languages. Such applications usually take original text in one language and perform a simple matching algorithm to produce text in another language, which hopefully has the same general meaning as the original text.

Prior art software translation applications utilize language translation that is literal, without considering the translation in context with the intended function in the target application. This approach can lead to comprehension difficulties for users of the software, including users of multi-lingual programs, i.e., computer programs which can provide a user interface having text elements (strings) in more than one language.

For example, a user interface may use the same word in two different components or parts of the program application, e.g., in English, but when the strings in the user interface are translated to another language, e.g., Chinese, there might be two different words that would correspond to the single English word depending upon the particular usage within the application. Thus, regardless of which of the Chinese words is selected for the literal translation, one of the uses will always be somewhat inaccurate. The use of simplistic, literal translation accordingly requires significant additional training for foreign users of the program application in order to properly understand operation of the application.

It would, therefore, be desirable to devise an improved method of translating text in a software program which could provide translations that more accurately reflect the intended meaning. It would be further advantageous if the method could allow users of multi-lingual software to gain a better understanding of strings they are translating, and how the user interface will be affected by changes in language.

SUMMARY

The foregoing objects are achieved in a method of operating a multi-lingual computer program, by executing the multi-lingual computer program on a computer system to present a user interface having a plurality of display areas which display text strings in a first language, entering a translation mode of the multi-lingual computer program for a second language which is different from the first language, identifying a first text string in the first language in a specific one of the plurality of display areas while the multi-lingual computer program is in the translation mode for the second language, and displaying a second text string in the second language corresponding to the first text string based on the specific display area. The second language can be selected from a list of more than two available languages. The program can match the second text string to the first text string by reference to a table which associates localizable text with the display areas. In one implementation, the user interface includes a parent window, and the display areas are different child windows located with the parent window. The second text string can be displayed proximate to the first text string within the specific display area, and can further be displayed as an entry in a table of a translation window of the user interface, the table also displaying additional text strings in the second language which correspond to additional text string fields for the specific display area.

The above as well as additional objectives, features, and advantages of the present invention will become apparent in the following detailed written description.

BRIEF DESCRIPTION OF THE DRAWINGS

The use of the same reference symbols in different drawings indicates similar or identical items.

DESCRIPTION OF THE PREFERRED EMBODIMENTS

Figure 1:
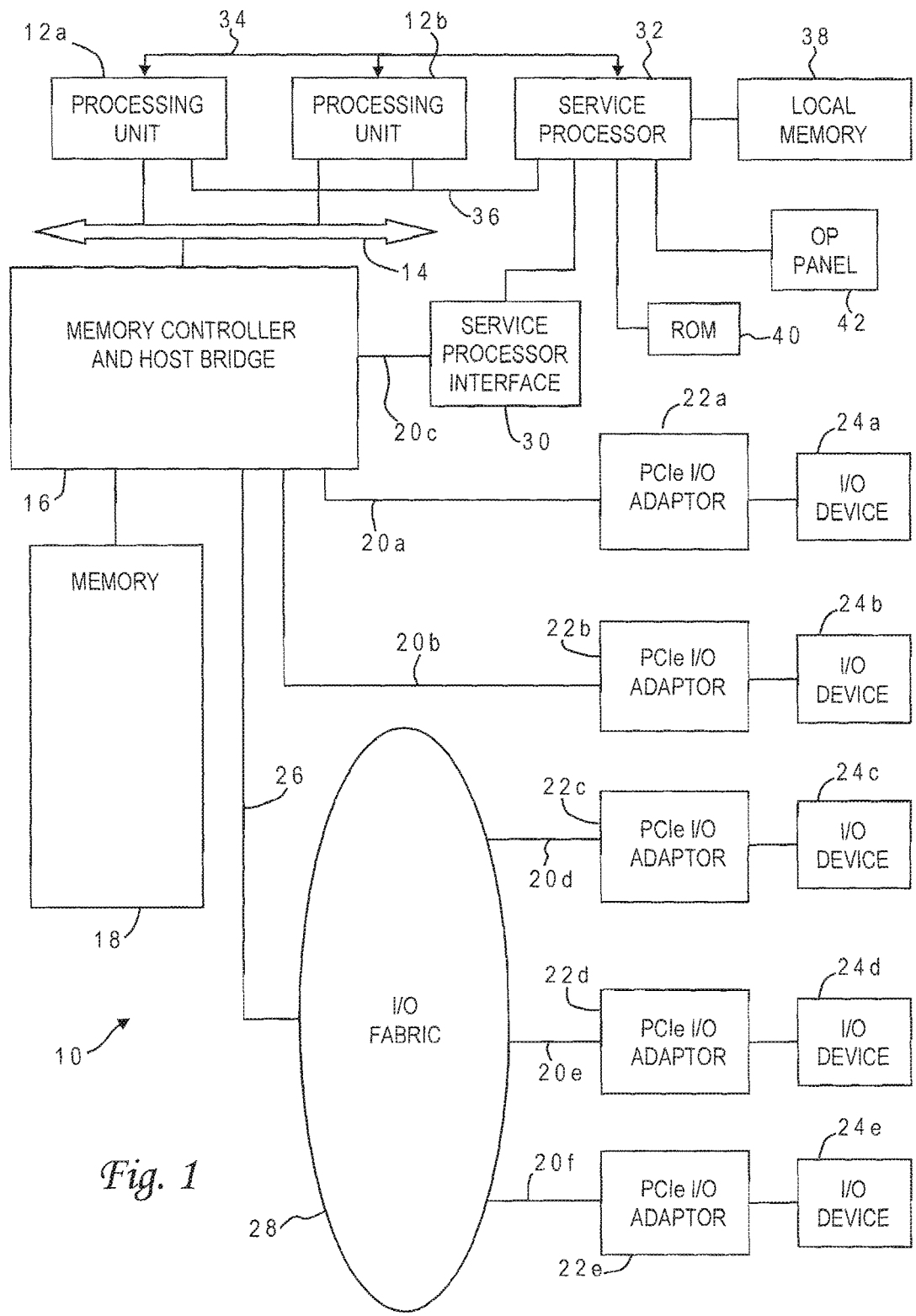
FIG. 1 is a block diagram of a computer system programmed to carry out broadcast automation software having a multi-lingual user interface in accordance with one implementation of the present invention.

With reference now to the figures, and in particular with reference to FIG. 1, there is depicted one embodiment 10 of a computer system in which the present invention can be implemented to carry out multi-lingual program applications, including the exemplary broadcast automation software described below in conjunction with FIGS. 2-4. Computer system 10 is a symmetric multiprocessor (SMP) system having a plurality of processors 12a, 12b connected to a system bus 14. System bus 14 is further connected to a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the broadcast automation software application used to illustrate the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

While the illustrative implementation provides program instructions embodying the present invention on a disk drive of computer system 10, those skilled in the art will appreciate that the invention can be embodied in a program product utilizing other computer-readable storage media. The program instructions may be written in the C++ programming language for a Windows® environment or in other programming languages suitable for other operating system platforms. Computer system 10 carries out program instructions for various application processes including a multi-lingual user interface. Accordingly, a program embodying the invention may include conventional aspects of various user interface tools such as windows, command menus, buttons, boxes, tabs, text fields, etc., and these details will become apparent to those skilled in the art upon reference to this disclosure.

Figure 2:
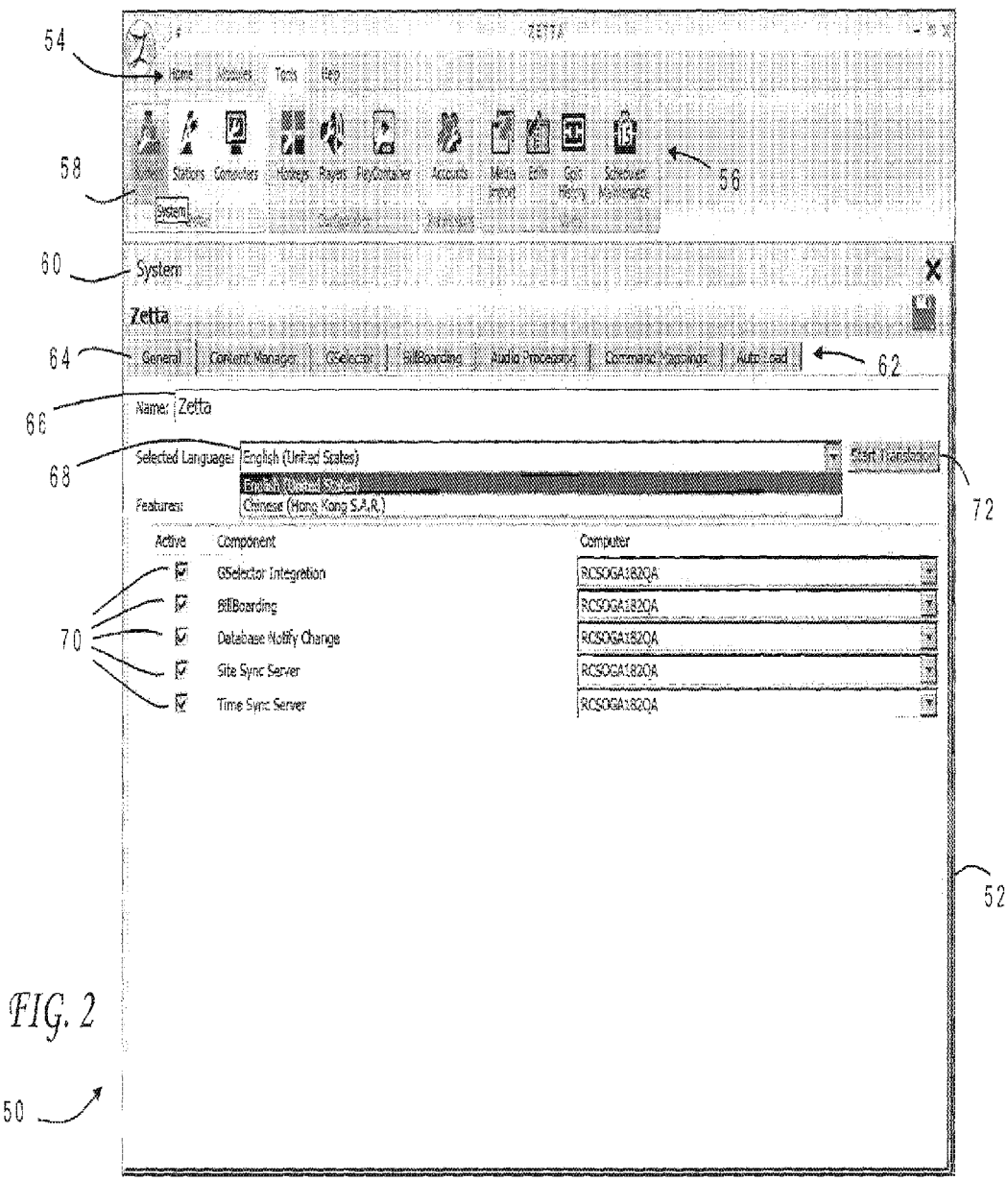
FIG. 2 is an image of a graphical user interface for broadcast automation software designed in accordance with one implementation of the present invention, including a parent window and a System child window with a General tab.
Figure 3:
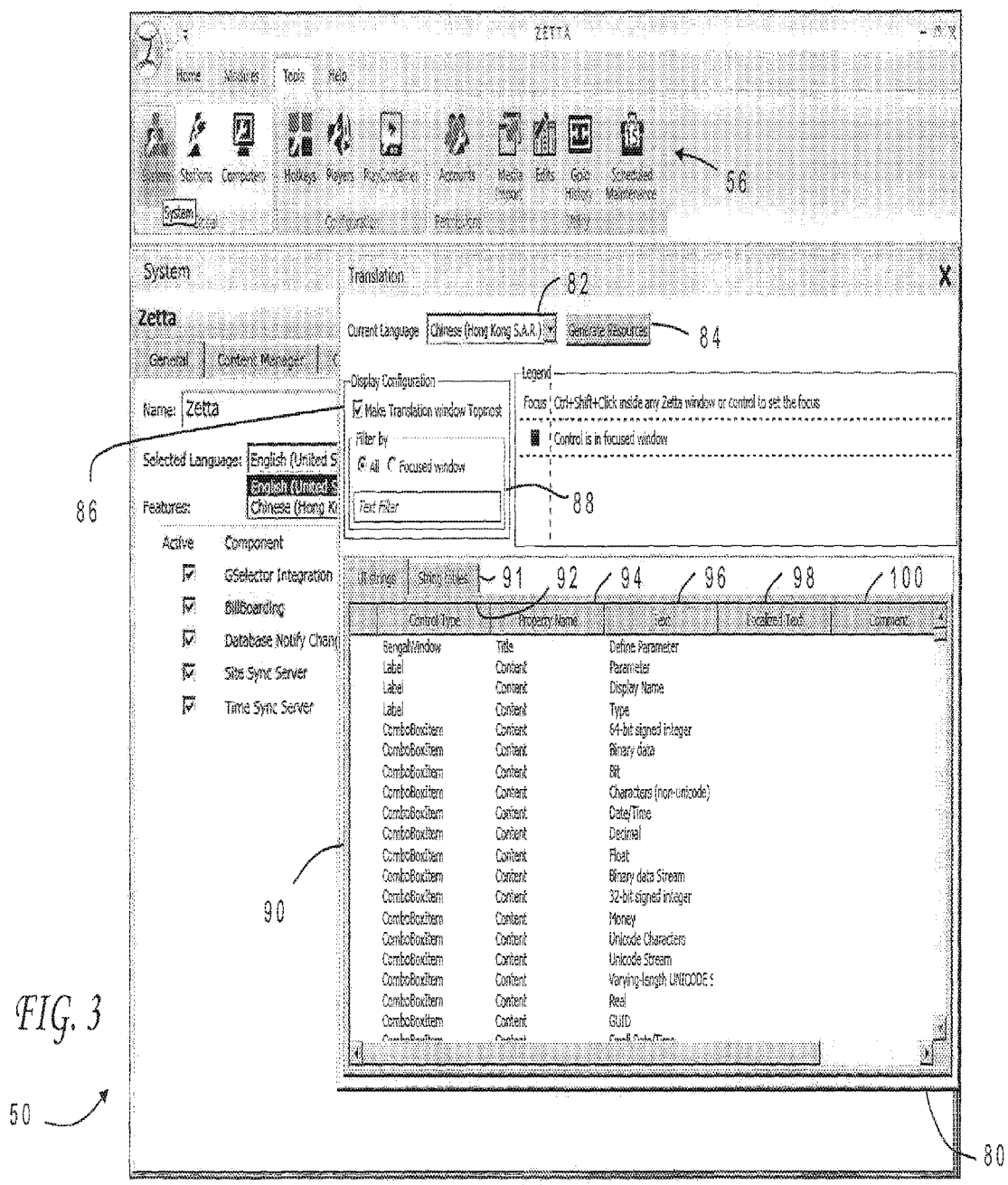
FIG. 3 is an image of a graphical user interface for broadcast automation software designed in accordance with one implementation of the present invention, including the parent window and System child window of FIG. 2 and further depicting a Translation child window.

In this exemplary application of the invention, computer system 10 is programmed to execute broadcast radio automation software, one user interface for which is illustrated in FIG. 2. User interface (UI) 50 can contain a parent window 52, and is designed to run on Windows 7, Windows Vista® OS and Windows XPC® OS, as well as other-language based operating systems such as Chinese Vista® OS and Chinese XP®. Within parent window 52 can be file commands 54, button toolbar 56, and system child window 60. File commands 54 can include general commands as well as application-specific commands relating to broadcast radio automation, and can be selected by using either the graphical pointing device (mouse) of computer system 10 or the keyboard of computer system 10. Selection of a particular file command causes a pull-down menu or button bar to appear having additional command items. In this example file commands 54 include a Home command, a Modules command, a Tools command, and a Help command. Selecting the Tools commands results in display of button toolbar. Button toolbar 56 has a plurality of buttons which are used to present associated child windows. In this example button toolbar 56 has three global buttons System, Stations and Computers, three configuration buttons Hotkeys, Players and PlayContainer, one permissions button Accounts" and four utility buttons Media Import, Edits, Gpio History and Scheduled Maintenance. System child window 60 can be accessed by selecting System button 58. System child window 60 can present several system functions which are further accessible via selectable tabs 62, including a General tab, a Content Manager tab, a GSelector tab, a BillBoarding tab, an Audio Processing tab, a Command Mappings tab, and an Auto Load tab. System general function 64 has several parameters, including name field 66, original language field 68, and features list 70. A user can choose a language to display UI strings (text) for the broadcast radio automation software by selecting a language from original language field 68. In this example the original language is English (US). As used herein, the term "string" includes not only ASCII letters and numbers, but also other letters, characters or symbols which correspond to written scripts or spoken words, letters or phrases in any language or dialect, including without limitation ideographs, hieroglyphs, or transliterations. The language can further be customized, for example, according to locality or other user preferences. In this manner a user can specify certain words or forms of words to be used in various fields, such as substituting the word "cheque" for "check," or substituting the phrase "Post Code" for "Zip Code."

System general function 64 can also include a selectable Start Translation button 72. When a user activates Start Translation button 72, the broadcast radio automation software responsively opens a Translation child window in UI 50, one illustration of which is shown in FIG. 3. Translation child window 80 is shown on top of system child window 60 and within parent window 52. Translation child window 80 can contain current language field 82, generate resources button 84, display configuration frame 86, filter frame 88, UI string pane 90, and string table pane 91. The desired language to translate UI strings into can be selected from a list of available languages (more than two) in current language field 82. These languages are pre-programmed into the broadcast radio automation software as desired by the application designer, and the text strings in the different available languages are localizable, meaning that the broadcast radio automation software has access to translation information for various languages which vary based on their context, i.e., the particular use within UI 50. The context is preferably specified by the child window in which a given UI string is located, i.e., the child windows respectively associated with each of the buttons in button bar 56 or other button bars. Thus a translation applied to a word/symbol/phrase in one child window might not give the same results as a translation on the same word/symbol/phrase in another child window. The child window context is just one implementation, and other granularities or display areas for identifying the context may be employed.

After the user activates generate resources button 84 to enter the translation mode, any child window can be selected as the focus of the translation, as well as any UI string. In this embodiment of the invention, a user can hold down the control and shift keys on the keyboard of computer system 10 while left-clicking with the mouse on a UI string or string set to translate. No other windows or string sets are translated with this selection process, and a colored-enabled container or other focus graphic is placed around the string set to be translated. This Ctrl+Shft+left-click selection allows the multi-lingual software application to identify the text string to be translated.

In the exemplary implementation the translation is based on a string table within the multi-lingual software application that is used to replace one language with another for the focus window and string set. This feature may be understood with reference to UI string pane 90 and string table pane 91. In this example, "All" is selected in filter frame 88, meaning that all localizable texts for any text fields in the application are displayed in UI string pane 90. If "Focused window" were selected in filter frame 88, then only the localizable texts for text fields in the currently selected window would be displayed in UI string pane 90. A given window is considered selected when the user executes the Ctrl+Shft+left-click input to select a localizable UI element in that window. If "Make Translation window Topmost" is selected in display configuration frame 86, then translation child window 80 will remain visibly on top of all other windows, but its size and position within parent window 52 may be adjusted so that any portion of an underlying child window is still visible. String table pane 91 shows all the UI strings not present in windows or controls, but instead located in message boxes, i.e., dialog boxes, as opposed to control or command features. While the tables are described as containing strings, those skilled in the art understand that this attribute may be implemented in the tables and stored in memory using pointers rather than the actual strings, where the pointers are addresses for the strings themselves located elsewhere in memory. The tables associate the text strings with their respective child windows which allows the translation function to match a string in one language to a string in another language based on context.

The localized text can be defined using extensible application markup language (XAML). Each entry in UI string pane 91 displays the text in which a given UI string is to be translated from, in text column 96. All parameters in text column 96 are in the language specified in original language field 68. Localized text (in localized text column 98) is the translated form of the given UI string. All of the parameters in text column 96 are in the language specified in current language field. For each of these entries, there are other associated parameters such as control type in control type column 92, property name in property name tab 94, and comments in comments tab 100. Meanings of string sets or portions thereof may vary within the software application, so that the specific replacement string set may use varied elements for replacement to meet the expectation of language and context translation. In FIG. 3, the localized text parameters in localized text column 98 are all blank because no window or string set has yet been selected for translation.

Figure 4:
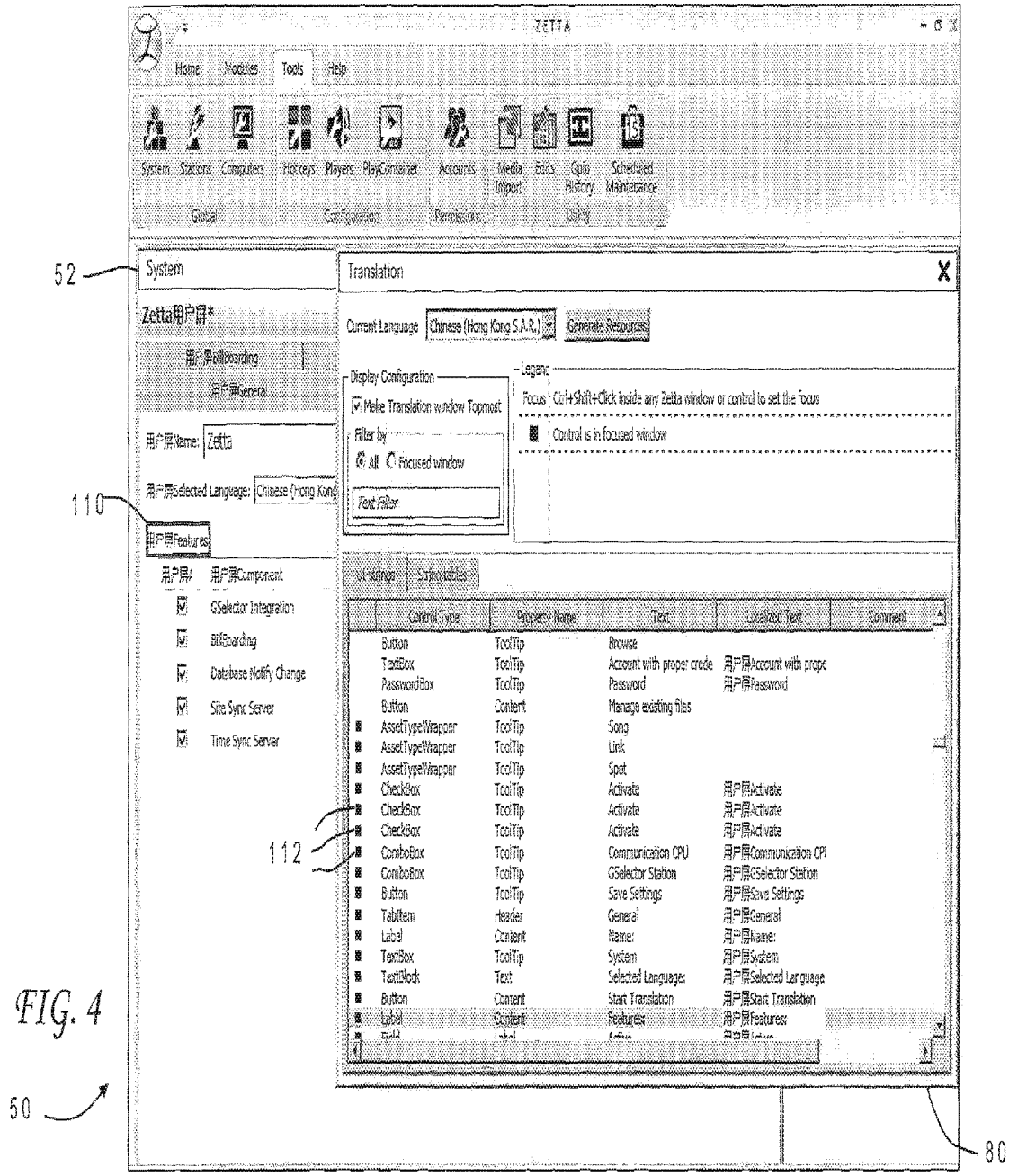
FIG. 4 is an image of a graphical user interface for broadcast automation software designed in accordance with one implementation of the present invention, including the parent window and System and Translation child windows of FIG. 3 and further depicting a selected string in the System child window being surrounded by a focus box with the corresponding highlighted entry in a user interface strings tab of the Translation child window.

FIG. 4 shows one embodiment of user interface 50 after a window and UI string have been selected and translated in the Chinese dialect referred to as Hong Kong S.A.R. The translation is immediate (real-time), and is shown in the focus window in the software application proximate the selected string. In other words, each UI string within the focus area has been translated into the language specified in current language field 82. In this example the focus area selected is in System child window 60, and the selected UI string "Features" is surrounded by a color enabled graphic 110. UI string pane 90 has changed significantly from FIG. 4. Control focus graphics 112 have appeared for several of the UI strings, which indicate that those UI strings are present within the window selected for translation (i.e., System child window 60). Each such UI string also now has a corresponding localized text in the localized text column 98. A user cannot localize if the current language is English (US) since it is the default language for this application. Other languages can be programmed as the default.

The application strings that can be translated to other languages exist in XML files, which contain translatable text from UI controls and string tables. The translatable text for UI controls can be extracted from XAML files and string tables into a XML file for each assembly (into a dynamic link library (DLL) or executable (exe) file) when building the application. The XML files can be zipped (compressed) to save space. By default these XML files are localized in English (US) language, and saved in the resource folder. To create a Chinese version of the application, the zipped XML files are copied, and are then translated and saved in a new Chinese resource folder. When the broadcast radio automation software application is started, it can set its language either based on the operating system (e.g., Windows) regional settings or a language selection stored as part of the application's configuration, or based on the user's individual preference. The application can then load the appropriate translated resources. The application can also allow changing the language at runtime.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. The general process of translation, which is an integral function of this application, should not be limited to visual text-based translation. In translation mode, a user can "Ctrl-Shift-Click" on a text field or string and the application can provide a translation sound file which is then made available to the user via an audio output device of the computer system, allowing the user to hear the corresponding text pronounced in the new language.

It is therefore contemplated that such modifications can be made without departing from the spirit or scope of the present invention as defined in the appended claims.

What is claimed is:

1. A computing device configured to implement broadcast automation software, the computing device comprising:
   a processor;
   a non-transitory computer-readable storage medium coupled to the processor and storing a program of instructions to be executed by the processor, the program of instructions including:
      at least one instruction to display at least two different windows of the broadcast automation software, each different window including a plurality of user interface (UI) strings programmed into the broadcast automation software, wherein a first UI string of the plurality of UI strings is included in both a first window and a second window;
      at least one instruction to translate the plurality of UI strings included in the first window from a default language into a first translation language, wherein the first UI string is translated into the translation language as a first translated UI string; and
      at least one instruction to translate the plurality of UI strings included in the second window from the default language into the translation language, wherein the first UI string is translated into the translation language as a second translated UI string different from the first translated UI string.

2. The computing device of claim 1, wherein translation information used to translate the plurality of UI strings varies based on a context in which the plurality of UI strings are used.

3. The computing device of claim 2, further comprising:
   at least one instruction to receive user input associating a particular language with a particular context.

4. The computing device of claim 1, further comprising:
   at least one instruction to receive user input selecting one of the first window and the second window as a focus window; and
   at least one instruction to translate the plurality of UI strings in the focus window.

5. The computing device of claim 1, further comprising:
   at least one instruction to select the default language based on a language selection stored during configuration.

6. The computing device of claim 1, wherein the translation language is a user customized language.

7. A method of translating windows displayed by broadcast automation software, method comprising:
   displaying at least two different windows of the broadcast automation software, each different window including a plurality of user interface (UI) strings programmed into the broadcast automation software, by executing a computer instruction;
   translating a particular UI string differently based, at least in part, on which of the at least two different windows is displaying the particular UI string, by executing a computer instruction; and
   presenting a first plurality of the UI strings in a context of a first window, by executing a computer instruction; and
   presenting a second plurality of the UI strings in a context of a second window, by executing a computer instruction.

8. The method of claim 7, further comprising:
   receiving user input associating a particular language with a particular context, by executing a computer instruction.

9. The method of claim 7, further comprising:
   receiving user input selecting one of the first window and the second window as a focus window, by executing a computer instruction; and
   translating the first plurality of UI strings if the first window is selected as the focus window, by executing a computer instruction; and
   translating the second plurality of UI strings if the second window is selected as the focus window, by executing a computer instruction.

10. The method of claim 7, wherein translating differently includes translating from a default language into one of a first language and a second language.

11. The method of claim 10, further comprising:
    selecting the default language based on a language selection obtained during configuration.

12. The method of claim 11, further comprising:
    translating the first plurality of UI strings from the default language into the first language; and
    translating the second plurality of UI strings from the default language into the second language.

13. A non-transitory computer-readable storage medium tangibly embodying a program of instructions executable by a processor, the program of instructions comprising:
    at least one instruction to display at least two different windows of a broadcast automation software, each different window including a plurality of user interface (UI) strings programmed into the broadcast automation software, wherein a first UI string of the plurality of UI strings is included in both a first window and a second window;
    at least one instruction to translate the plurality of UI strings included in the first window from a default language into a translation language, wherein the first UI string is translated into the translation language as a first translated UI string; and
    at least one instruction to translate the plurality of UI strings included in the second window from the default language into the translation language, wherein the first UI string is translated into the translation language as a second a second translated UI string different from the first translated UI string.

14. The non-transitory computer-readable storage medium of claim 13, wherein translation information used to translate the plurality of UI strings varies based on a context in which the plurality of UI strings are used.

15. The non-transitory computer-readable storage medium of claim 14, further comprising:
    at least one instruction to receive user input associating a particular language with a particular context.

16. The non-transitory computer-readable storage medium of claim 13, further comprising:

at least one instruction to receive user input selecting one of the first window and the second window as a focus window; and at least one instruction to translate at least one of the plurality of UI strings in the focus window.

17. The non-transitory computer-readable storage medium of claim 13, further comprising:

at least one instruction to select a default language based on a language selection stored during configuration.

18. The non-transitory computer-readable storage medium of claim 13, wherein the translation language is a user customized language.

* * * * *